Feb. 1, 1966 R. L. LA BARGE 3,232,395
PANEL JOINT CONSTRUCTION
Filed Oct. 17, 1962 2 Sheets-Sheet 1

INVENTOR.
Robert L. LaBarge
By Robert T. Teeter
Attorney

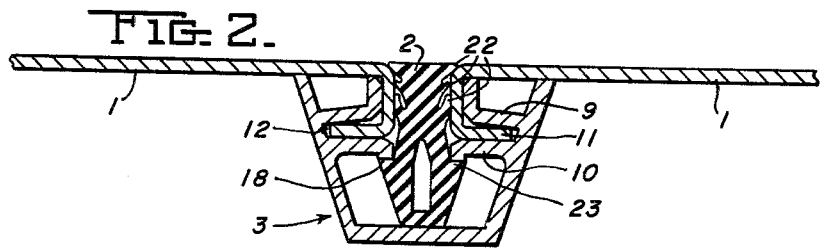
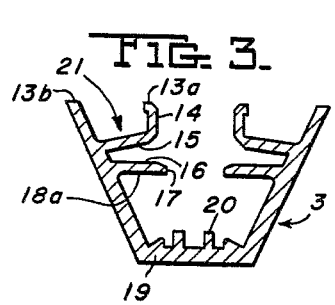
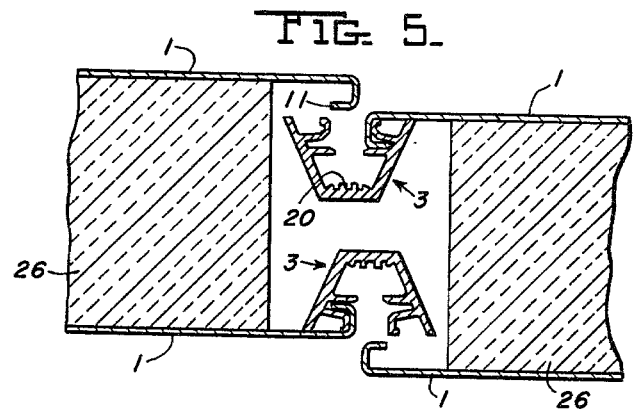
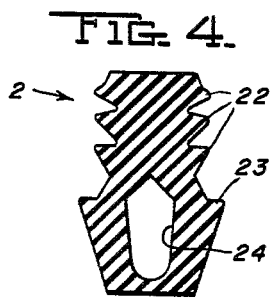
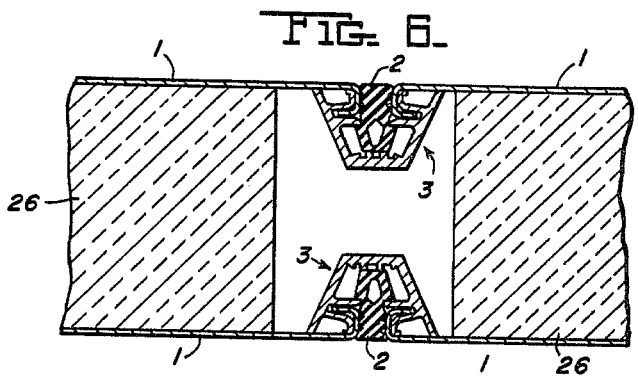
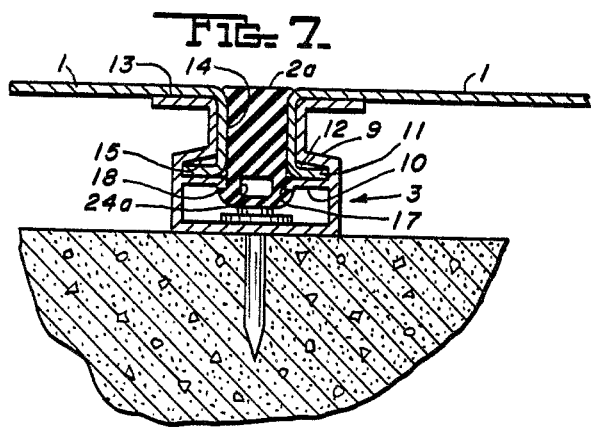
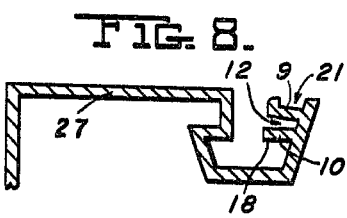

United States Patent Office 3,232,395
Patented Feb. 1, 1966

3,232,395
PANEL JOINT CONSTRUCTION
Robert L. La Barge, Murrysville, Pa., assignor to Aluminum Company of America, Pittsburgh, Pa., a corporation of Pennsylvania
Filed Oct. 17, 1962, Ser. No. 231,190
6 Claims. (Cl. 189—36)

This invention relates to improvements in panel joint construction, and panel-joining members therefor.

A general object of the invention is to provide a panel joint which is capable of simple, economical assembly and disassembly while at the same time exhibiting rattle-free characteristics, particularly a panel joint not requiring either longitudinal sliding assembly or back-up support during assembly.

Another object of the invention is to provide a panel joint capable, when incorporating a suitably strong joining or splicing member, of transmitting the full bending and tensile strength of the panel material across the joint.

Yet another object of the invention is to provide a panel joint which is sealed in such a manner as to resist moisture penetration.

Other objects and advantages of the invention will be understood from the following description of the invention, on reference to the illustrations appended hereto in which:

FIG. 2 is a cross-sectional view of the panel joint of FIG. 1;

FIG. 3 is a cross-sectional view of another form of splicing member adapted for use in a panel joint in accordance with the invention;

FIG. 4 is a cross-secional view of another form of filler member;

FIGS. 5 and 6 are cross-sectional views of a sandwich panel joint, employing splicing and filler members shown in FIGS. 3 and 4, before and after assembly;

FIG. 7 is a cross-sectional view of another panel joint employing splicing and filler members of still another form; and FIG. 8 is a cross-sectional view of a one side panel joint adaptor for terminal locations and the like.

Figure 1:
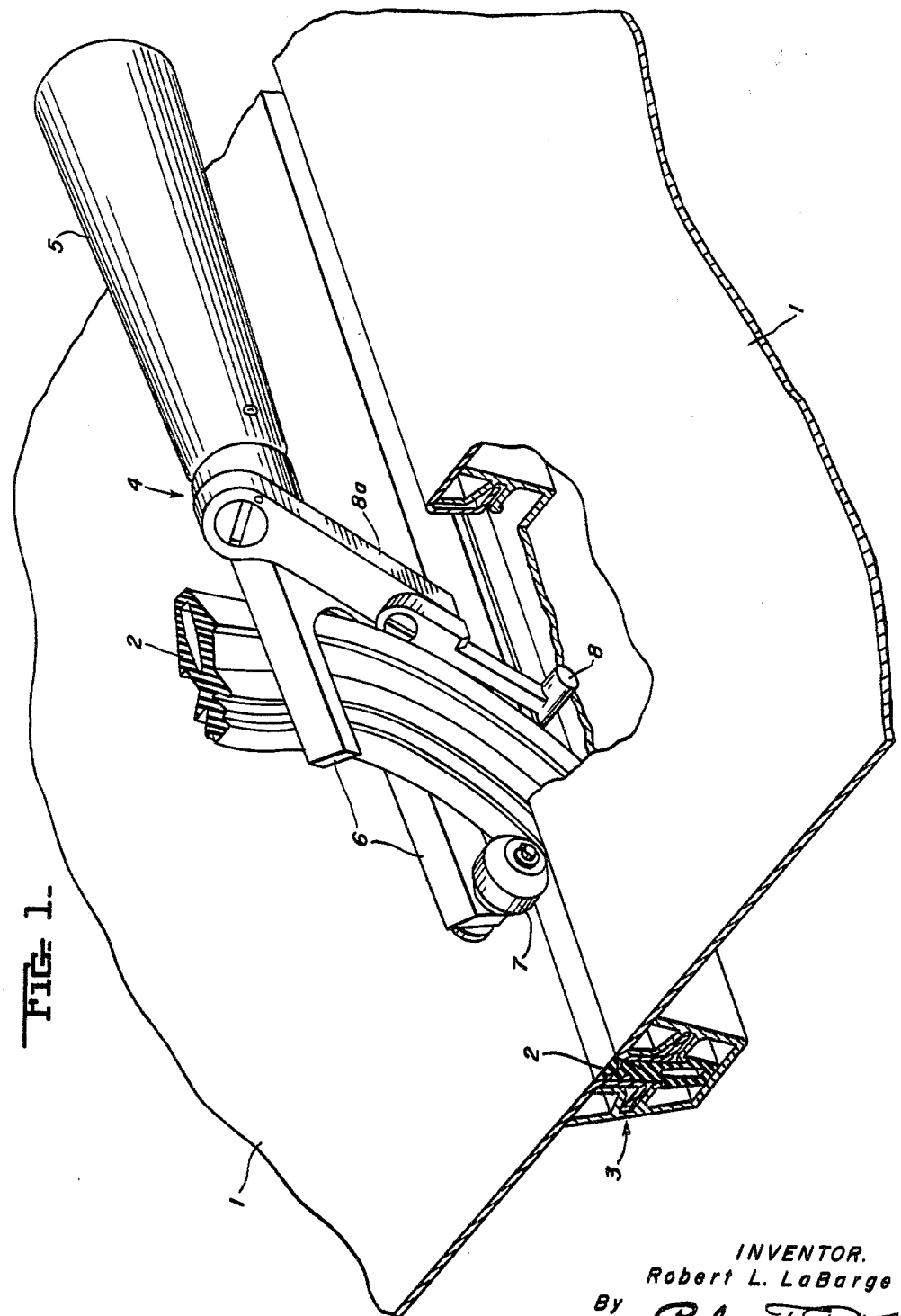
FIG. 1 is a perspective view, partly in section, showing a panel joint embodying the invention being made, with a tool shown inserting a filler member into a splicing member.

Referring to FIGS. 1 and 2, one form of panel joint embodying the invention is illustrated, together with a tool that may conveniently be used to complete the joint. The joint consists of a splicing member 3 and two panels 1 whose edges have return bends or hooks 11 engaged in said splicing member, together with a stuffer member 2 used to secure the joint. A preferred type of joint forming tool 4 consists of a handle 5, a J-shaped filler member guide 6, a roller 7, and a T-bar 8. The filler member guide 6 and the T-bar 8 (through a pivoted intermediate arm 8a) are both connected to the handle 5. The roller 7 is supported at the end of the longer (lower) arm of the filler member guide 6.

The return bends or hooks 11 in the panel edges are preferably of generally rectangular configuration as shown. One form of splicing member 3 is shown in FIG. 2, and a modified form of splicing member 3 is shown in FIG. 3. Referring to either the form of FIG. 2 or that of FIG. 3, the splicing member has an outer bearing element 9 and an inner bearing element 10 on each side. Each outer bearing element 9 has an outer bearing surface 13a, 13b, a lateral bearing surface 14 and an inner bearing surface 15, the lateral bearing surface connecting with the other two at chamfered corners. The outer bearing surface has a recess 21 between the portions 13a and 13b thereof. The inner bearing element 10 has an outer bearing surface 16, a lateral bearing surface 17 and an inner bearing surface 18a, the lateral bearing surface connecting with the outer bearing surface at a chamfered corner. The outer and inner bearing elements on each side cooperate to define a slot 12 therebetween. The splicing member 3 thus comprises two opposed portions defining an opening therebetween and has two opposed slots 12 which may conveniently be so disposed as to create symmetry about a plane through the opening in the generally C-shaped splicing member. In FIG. 3, the splicing member 3 has a base portion 19 with two finlike protrusions 20 convenient for use in assembling and dissasembling dual panel joints such as those shown in FIGS. 5 and 6. In the splicing member 3 shown in FIG. 2 it will be noted that the inner bearing surface 18 of the inner bearing element 10 is undercut, but the corresponding surface 18a in FIG. 3 is not. This is optional. The modified form of splicing member 3a shown in FIG. 7 contains no capillary recess 21 in outer bearing surface 13, and no finlike protrusions 20 on base 19. These are optional. The lateral bearing surface 14 of the outer bearing element 9 is more elongated in FIG. 7. Otherwise this form is generally similar to the other forms.

The form of filler member 2 shown in FIGS. 2 and 4 is made from a resilient material, e.g. synthetic rubber or plastic, and has sealing ridges 22, retaining shoulders 23 and an elongated void 24.

Referring once more to FIGS. 1 and 2, after locating the ends of hooks 11 in slots 12, the joint is conveniently completed by use of the joint forming tool 4 with its T-bar 8 inserted and bearing against the inner bearing surfaces 18 of the inner bearing elements 10. The filler member 2 is inserted in the filler member guide 6, placed above the joint opening to be filled and under the roller 7. The handle 5 of the joint forming tool 4 is lifted upward and pulled to move the tool along the joint opening, thereby pressing the roller 7 down and pushing the filler member 2 into the joint opening as the tool moves along. This operation requires no end to end sliding of joint elements and no back-up support of the joint.

As more clearly shown in FIGS. 2 and 3 the rectangular return bends or hooks 11 of the panel edges are in contact with the spaced portions of the outer bearing surfaces 13a, 13b of the outer bearing elements 9, with the lateral bearing surfaces 14 of the outer bearing elements and with the ends of the hooks 11 being in contact with the outer bearing surfaces 16 of the inner bearing elements 10 and bearing on the inclined inner bearing surfaces 15 of the outer bearing elements 9. This produces a wedge fit which acts to increase the joints resistance to bending. For maximum bending resistance, the point of contact of the end of the hook 11 with the inner bearing surface 15 when projected to the plane of the outer bearing surface falls about midway between the ends of the outer bearing surface 13a, 13b. The filler member 2 has its retaining shoulders 23 in contact with the undercut inner bearing surfaces 18 of the inner bearing element 10, its sealing ridges 22 in contact with the surfaces of the sections of the hooks 11 which are in contact with the lateral bearing surfaces 14. The outer extremity of the filler member 2 may lie essentially in the plane of the panels 1, and the inner extremity may conveniently be in contact with the splicing member base portion 19 or with the finlike protrusions 20.

The sandwich panel units shown in FIGS. 5 and 6, each consist of two facing panels 1 with an insulting core material 26 located between and separating said facing panels. In effecting a joint in this sandwich panel construction, two of the return bends 11 may be engaged in slots 12 of diagonally opposite splicing members 3 as shown in FIG. 5, said bends being retained in said slots during assembly by the friction fit obtained when the ends of the return bends are inserted in the tapered slots. One sandwich panel is then moved relative to the other until the unengaged return bends 11 are opposite the other two retaining slots 12. When necessary, the unengaged return bends and retaining slots may then be aligned by inserting a putty knife or like tool against one of the finlike protrusions 20 and displacing the splicing member 3 in the desired direction. Each remaining return bend 11 is then engaged in the desired retaining slot 12. To complete the joint a filler member 2 may then be inserted. Should subsequent disassembly be desired a putty knife or like tool may be inserted into the opening and against one of the protrusions 20 to aid in moving the splicing member 3, after the filler member 2 has been removed. In the modified embodiment of the invention shown in FIG. 7, the splicing member 3 contains a continuous outer bearing surface on the outer bearing element 13 and has no capillary break 21. The lateral bearing surface of the outer bearing element 14 is widened and necessitates the use of a corresponding widened return bend 11. The filler member 2a is generally rectangular and contains sealing ridges 22, retaining shoulders 23, and a rectangular void 24.

A modified form of the invention, particularly suited to be used in corner sections or places in which a panel terminates at a window, door, or like obstacle, is shown in FIG. 8. One portion of the joining member has the same configuration as that used in splicing members used in joining two panels. The other portion does not have a retaining slot or capillary recess, but has an adaptor flange 27. The design of this latter portion may be such that the same filler member used in joining two panels may be used. Thus, the benefits of the invention may be obtained throughout a paneled structure and need not be limited to areas where two adjacent panels are to be spliced. While a corner joint may be obtained by using two two-slotted splicing members attached to either end of a corner panel having a right angle bend therein, the modified joining member may be preferred in some applications.

It is to be noted that the embodiments of the invention shown in the figures are for illustrative purposes and are not to be interpreted as limiting the scope of the invention. The configuration of the splicing member 3, for example, has been shown with an angular intersection at the points where the base portion meets the side portion thereof. This intersection may, within the invention, be curved as well as angular so long as the over-all configuration of the splicing member 3 is of generally C shape. Also, although the double bend or hook 11 and the outer bearing element 9 have been illustrated as generally rectangular in shape, it is permissible within the invention to make them in a curved or other desired shape so long as the return end engages in the retaining slot 12. Further, although the inner bearing surfaces 15 of the outer bearing elements 9 desirably have an inclination outwardly and toward each other, it is within the invention to have them substantially parallel to the bearing surface 16 of the inner bearing element 10. Another modification of the invention has the inner bearing surface 15 of the outer bearing elements 9 and the outer bearing surfaces 16 of the inner bearing elements 10 inclined outwardly. Also, although for reasons of structural stability it is deemed preferable to have the inner bearing elements 10 extending further toward each other than do the outer bearing elements 9, and to have the splicing member 3 symmetrical about a plane through the center of its opening, these features are not essential to the practice of the invention. Further, although the panels to be joined may be sheets of metal, it should be noted that the invention is equally applicable to the joining of cast or extruded members as well as panels of non-metallic materials. It is not necessary that the return hook or double bend be a part of the panel itself. It is sufficient that the hook 11, whether or not composed of the same material as the panel, be securely affixed to the panel edge.

In effecting joint, the T-bar 8 of the joint forming tool 4 may be inserted into the aperture defined by the inner bearing surfaces 18 of the inner bearing element 10 and the portion of the splicing member 3 disposed beneath said surfaces, and may be drawn up against said inner bearing surfaces 18 of said inner bearing elements 10. To aid in affecting the insertion of the T-bar into the aperture, without the need for inserting it at the end of the joint opening, the intermediate arm 8a which connects the T-bar to the handle 5 may conveniently be arranged to pivot about the handle, as shown. Completing a joint in this manner eliminates the need for backing up the parts during the joining process. It has the additional advantage of minimizing the force applied to the parts during the joining process. While this is a preferred means of assembly, it is by no means essential to the invention that a joint forming tool 4 be used. In lieu thereof the filler memebr 2 may be inserted into the joint opening by use of the fingers or any covenient tool. In fact, the use of a great variety of stuffer members, without the necessity of altering the other elements of the joint, is contemplated. Insofar as materials are concerned, a resilient material such as synthetic rubber or an organic plastic has been found to be effective. Formed sheet metal and solid metal bars may be used. Among the other permissible materials are caulking, putty, plaster and the like. The choice of material is not critical, and many others may be used to obtain the beneficial results of the invention. Optionally, foil or other material may be laminated to the outer surface of the stuffer member 2 and thus provide a color match with the joined panels, sunlight protection and improved over-all appearance of the joint.

A vast number of stuffer member shapes may be employed effectively. To a great extent the configuration selected will depend upon the material used and the requirements of the particular joint usage. In the form shown in FIG. 4, retaining shoulders 23 are engaged with the inner bearing surface 18 of the inner bearing element 10 to produce greater joint stability. In an installation wherein frequent joint disassembly would be necessary a modified shape for the retaining shoulders 23 and inner bearing elements 10 may be desirable so as to permit easy removal of the stuffer member without damage to the stuffer or to other portions of the joint. Conveniently, the retaining shoulders might be in the shape of a semicircular bead, and the intersection of the inner and lateral bearing surfaces 18, 17 may be chamfered. The sealing ridges 22 shown in FIG. 4 bear on the hook 11 and prevent moisture penetration. In addition, they prevent joint rattling. The degree of ratle prevention obtained is directly related to the material used, with a resilient material being preferable. It should be noted that the waterproof and anti-rattle characteristics are not created as a result of the filler mmeber 2 alone, but rather as a result of the filler member in combination with the unique joint design which results in continuous joint. As is shown in FIGS. 3 and 4 the inner bearing surface 15 of the outer bearing element 9 may conveniently be inclined so as to provide a friction fit during assembly and increased rattle-free characteristics after assembly. Further moisture proofing characteristics are found in the embodiment of the invention which contains a recess 21 in the splicing member. This recess provides a capillary environment affording an effective barrier to moisture passage into the interior of the joint.

The stuffer member 2 in the embodiment of the invention shown in FIGS. 1 and 2 extends from the plane of the joined panels 1 to the splicing member base 19. Employing a stuffer member of such depth, with some form of retaining shoulder being used to engage the inner bearing surface of the inner bearing element, increases the filler retention characteristics of the joint. It is not, however, necessary that the stuffer member extend that far. It is simply desirable that the critical area between the lateral portions of the return bend 11 be substantially filled.

In addition to the aforementioned functions of the filler member, it should be noted that it serves as an expansion element, allowing both thermal and mechanical expansion to occur without a reduction in the performance characteristics of the joint.

An advantage of the invention lies in its remarkable load bearing characteristics. The splicing member design is such that a long outer bearing surface 13 or 13a, 13b of the outer bearing element 9 provides added support for each panel, thus increasing joint strength. As a result of the hooked edges 11 being engaged in the slot 12 and retained therein by the filler member 2, the full bending and tensile strength of the panel material can be transmitted across the joint so long as a sufficiently strong splicing member is employed. Selection of a proper stuffer member results in increased compressive load capacities. These latter vary with variations in stuffer material, stuffer configurations and manufacturing tolerances in the splice member and panels. Although it is not necessary to the effective practice of the invention, adhesive may be applied between the panel edges and the portions of the splicing member 3 on which said edges will bear.

In a suggested form of the invention as shown in FIGS. 2 and 3, the inner bearing elements 10 extend further toward each other than do the outer bearing elements 9. This allows the outer bearing surface 16 of the inner bearing element 10 to aid in minimizing the effects of bending loads by preventing inward movement of the lateral portion of the hooked edge. Also, the extension aids in guiding oversized edges into the slot 12. Yet another function of this extension is to aid in stuffer retention.

An example illustrating one type of joint in which the invention may conveniently be employed may aid one skilled in the art in understanding the invention.

*Example.*—An aluminum panel 0.040 inch thick has edges formed into a double bend with 0.187 inch between the sheet and the parallel return portion. The splicing member is an aluminum extrusion with a wall thickness of .062 inch, with a base section 0.593 inch wide and a member height of 0.625 inch. The inner bearing elements have undercut inner bearing surfaces and 30° chamfers at the intersections of the outer and lateral bearing surfaces. The inner bearing elements each extend 0.030 inch beyond the plane of the lateral bearing surface of the outer bearing element. The upper bearing elements have capillary recesses in their outer bearing surfaces and 45° chamfers at the intersections of the lateral bearing surfaces with the outer and inner bearing surfaces. The filler member is made of neoprene, has a height of 0.60 inch and contains an elongated void 0.28 inch in major dimension beginning 0.06 inch above its base. A pair of sealing ridges are located 0.06 inch from the top edge and convex side wall protrusions are located further down from the top edge. A pair of retaining shoulders are located 0.40 inch down from the top edge. In assembling the joint the panel edges are inserted into the retaining slots until a friction fit is obtained. The filler member is then inserted into the extruded splicing member opening until the retaining shoulders engage the inner bearing surface of the inner bearing element. The convex side walls of the stuffer member will bear on the lateral portion of the return bend as will the sealing ridges. The outer edge of the filler member lies substantially in the plane of the joined aluminum panels.

Of great importance is the simplicity with which the joint may be effected, and the resultant economy. As the return bends may be pre-formed there is no need for any sheet forming during assembly, thus eliminating the need for expensive tools. No holes need be made in forming the joint. Holes would not only increase the cost of the joint, but would weaken the sheet and joint, and would encourage leaks. The configuration of the joint is such that it may be made where there is access to only one side of the panels to be joined. The inclined surface of the inner bearing surface 15 of the outer bearing element 9 is such that easy engagement of the hook is permitted. As end to end sliding is unnecessary, panels of great length may be joined. Optionally, the intersection of the inner bearing surface 15 with the lateral bearing surface 14 of the outer bearing element 9 and the intersection of the outer bearing surface 16 with the lateral bearing surface 17 of the inner bearing element 10 may be chamfered to provide even for ease in inserting the double bend or hook 11 into retaining slot 12. The splicing member which contains protrusions 20 is particularly suitable for easy assembly of a sandwich panel joint. As stated above, the joint permits of rapid disassembly where a removable stuffer member is employed. As the parts are re-usable, economical re-assembly is possible.

Typical of applications in which the invention may be employed advantageously include buildings and vehicles, demountable buildings, walls, partitions, roofing and sandwich panel applications, for example. This enumeration of possible applications is by no means exhaustive, and numerous additional uses will be apparent to those skilled in the art. It is to be understood that the discussion of possible embodiments of the invention above is merely illustrative and in no way narrows the scope of the invention, and that numerous modifications can be made without departing from the invention.

Having thus fully disclosed my invention, I claim:

1. An elongated panel-joining member having a cross section of generally C shape, comprising two opposed portions defining an opening therebetween,
    at least one of the opposed portions of said member comprising an outer and an inner bearing element defining a slot therebetween facing toward the other opposed portion,
    said outer bearing element having an inner bearing surface, an outer bearing surface, and a connecting lateral bearing surface,
    said inner bearing element having an outer bearing surface opposite said inner bearing surface of said outer bearing element and an inner bearing surface,
    whereby at least one panel may be joined to the C-shaped member at a panel edge having a return bend disposed about said outer bearing element and adapted to be engaged in said slot and adapted to be retained therein by a filler member adapted to extend into the opening in the C-shaped member.

2. An elongated panel-splicing having a cross section of generally C shape, comprising two opposed portions,
    each of the opposed portions of said member comprising an outer and an inner bearing element defining a slot therebetween facing toward a like slot in the other opposed portion,
    each of said outer bearing elements having an inner bearing surface, an outer bearing surface having a recess therein, and a connecting lateral bearing surface, said inner bearing surfaces being inclined outwardly toward each other,
    each of said inner bearing elements extending further toward each other than do said outer bearing elements and having an outer bearing surface opposite said inner bearing surface of said outer bearing element, and an inner bearing surface,
    whereby two adjacent substantially co-planar panels may be joined at edges having return bends disposed about said outer bearing elements, and adapted to be engaged in said slots and adapted to be retained therein by a filler member adapted to extend therebetween.

3. In a panel joint construction, a spliced panel joint comprising
    two adjacent substantially co-planar panels having facing edges provided with return bends therealong, an elongated panel-splicing member having a cross section of generally C shape, comprising two opposed portions, each of the opposed portions of said member comprising an outer and an inner bearing element defining a slot therebetween facing toward a like slot in the other opposed portion, each of said outer bearing elements having an inner bearing surface, an outer bearing surface, and a connecting lateral bearing surface, each of said inner bearing elements having an outer bearing surface opposite said inner bearing surface of said outer bearing element and an inner bearing surface, said panels having their said edges disposed about said outer bearing elements, with the return bends thereof engaged in said slots, and a filler member retaining said panel edges in the aforesaid disposition by extending therebetween and inwardly beyond the plane of the outer bearing surfaces of the inner bearing elements with portions of the filler member engaging the inner bearing surfaces of the inner bearing elements.

4. In a panel joint construction, a spliced panel joint comprising two adjacent substantially co-planar panels having facing edges provided with return bends therealong, an elongated panel-splicing member having a cross section of generally C shape, comprising two opposed portions, each of the opposed portions of said member comprising an outer and an inner bearing element defining a slot therebetween facing toward a like slot in the other opposed portion, each of said outer bearing elements having an inner bearing surface, an outer bearing surface having a recess therein, and a connecting lateral bearing surface, said inner bearing surfaces being inclined outwardly toward each other, each of said inner bearing elements extending further toward each other than do said outer bearing elements and having an outer bearing surface opposite said inner bearing surface of said outer bearing element, and an inner bearing surface, said panels having their said edges disposed about said outer bearing elements with the return bends thereof engaged in said slots, and a filler member retaining said panel edges in the aforesaid disposition by extending therebetween and inwardly beyond the plane of the outer bearing surfaces of the inner bearing elements with portions of the filler member engaging the inner bearing surfaces of the inner bearing elements.

5. In a panel joint construction, a spliced panel joint comprising two adjacent substantially co-planar sandwich panels each having two surface layers of exterior panel material with an insulating material located therebetween, each of said surface layers being provided with substantially rectangular return bends along the edges thereof that are to be joined, and each pair of said edges to be joined being provided with, an elongated panel-splicing member having a cross section of generally C shape, comprising two opposed portions defining an opening therebetween, each of the opposed portions of said member comprising an outer and an inner bearing element defining a slot therebetween facing toward a like slot in the other opposed portion, each of said outer bearing elements having an inner bearing surface, an outer bearing surface, and a connecting lateral bearing surface, each of said inner bearing elements having an outer bearing surface opposite said inner bearing surface of said outer bearing element and an inner bearing surface, said panels having their said edges disposed about said outer bearing elements with the return bends thereof engaged in said slots, and a filler member retaining said panel edges in the aforesaid disposition by extending therebetween and inwardly beyond the plane of the outer bearing surfaces of the inner bearing elements with portions of the filler member engaging the inner bearing surfaces of the inner bearing elements.

6. The panel joint construction of claim 5 wherein the portion of the elongated panel-splicing member opposite the opening therein has protrusions extending therefrom in the direction of the opening and terminating inwardly of the inner bearing surfaces of the inner bearing elements.

References Cited by the Examiner
UNITED STATES PATENTS 2,627,949   2/1953   Willson _____ 189—36
3,066,773   12/1962  Raidel _____ 189—36

FRANK L. ABBOTT, Primary Examiner.

RICHARD W. COOKE, Examiner.